Figure 10:
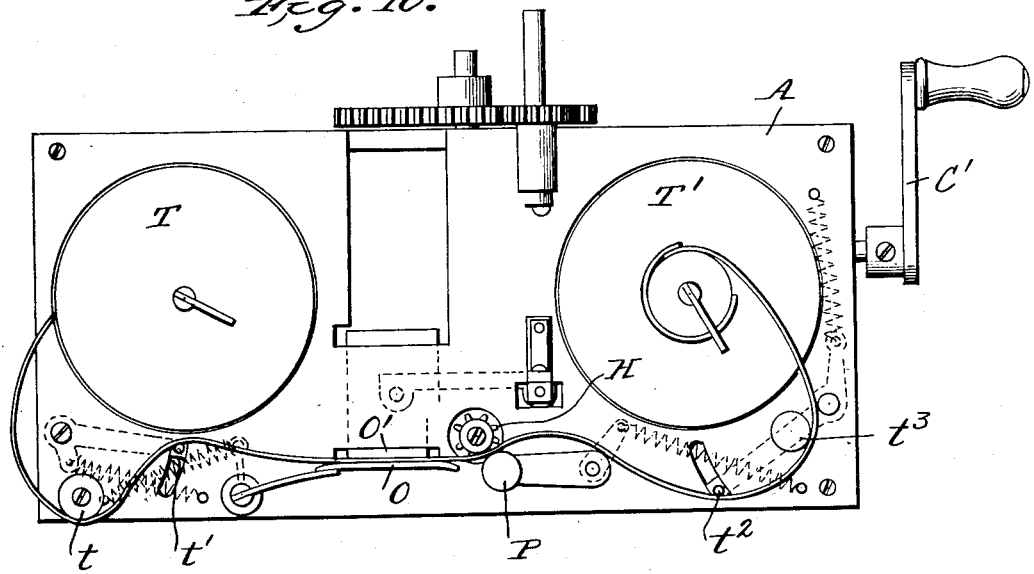

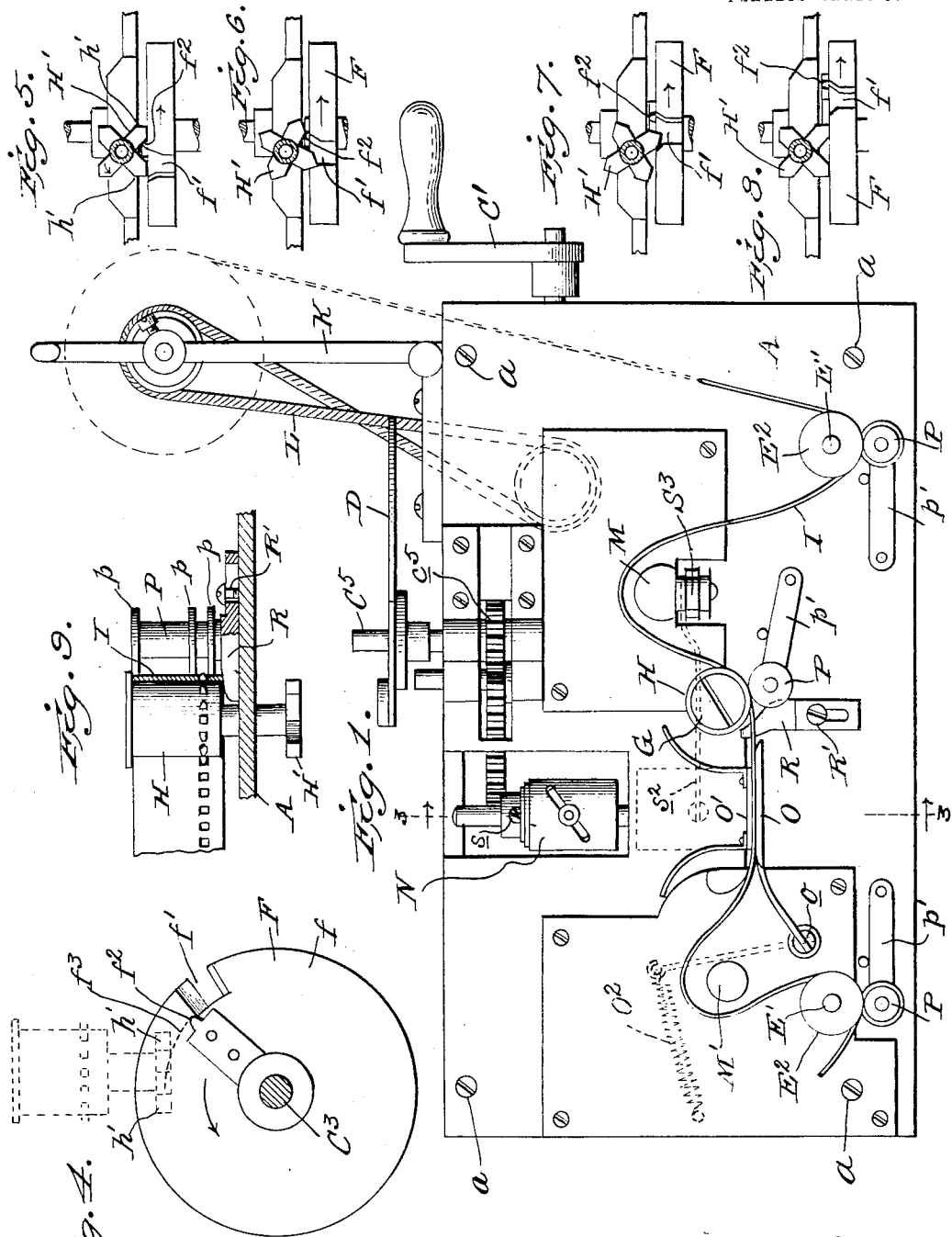

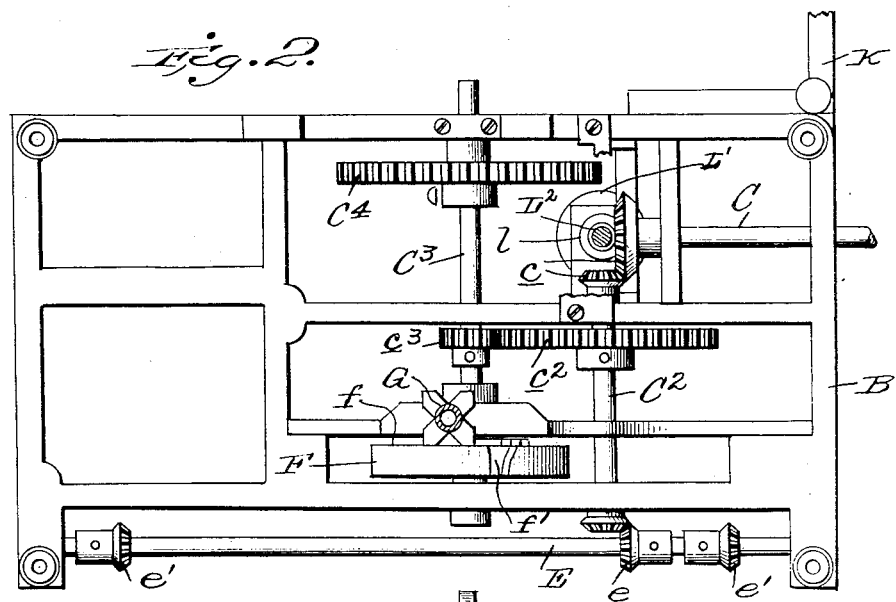
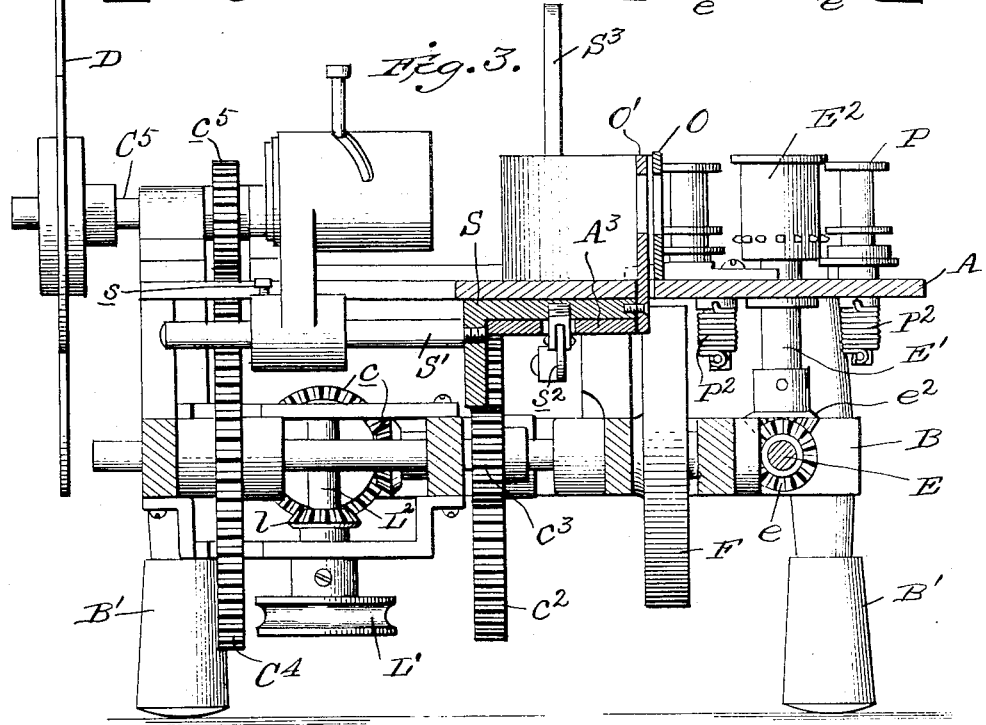

T. ARMAT.
MOTION PICTURE APPARATUS.
APPLICATION FILED OCT. 15, 1913.

1,112,751.

Patented Oct. 6, 1914.
4 SHEETS—SHEET 3

T. ARMAT.
MOTION PICTURE APPARATUS.
APPLICATION FILED OCT. 15, 1913.
1,112,751.
Patented Oct. 6, 1914.
4 SHEETS—SHEET 4.
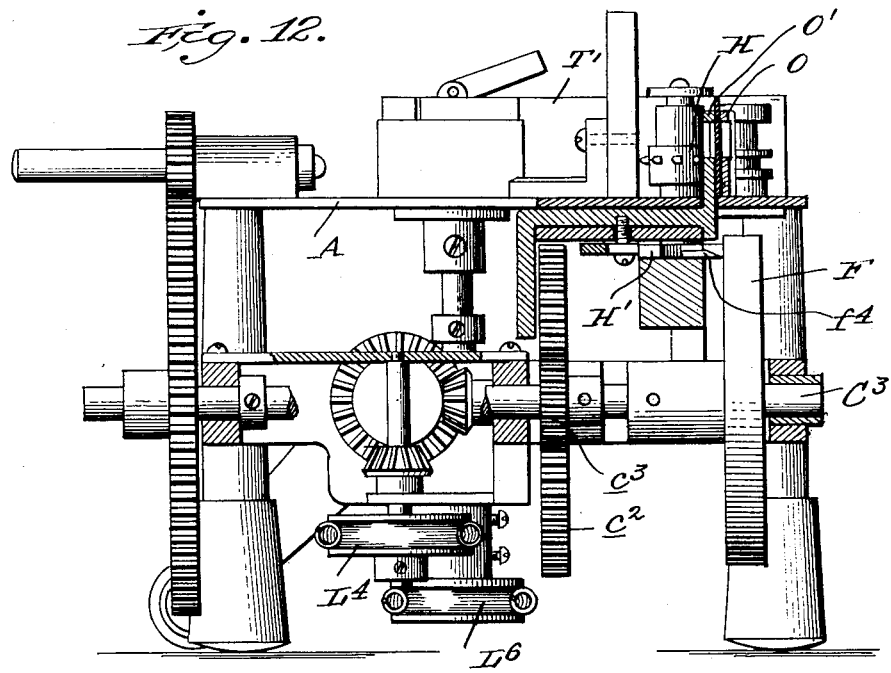
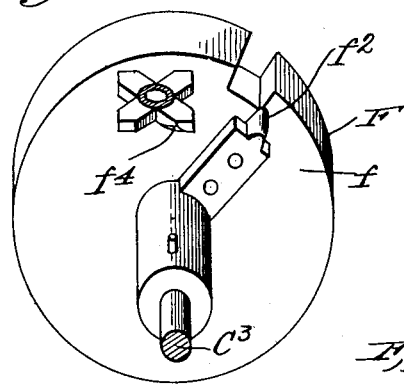
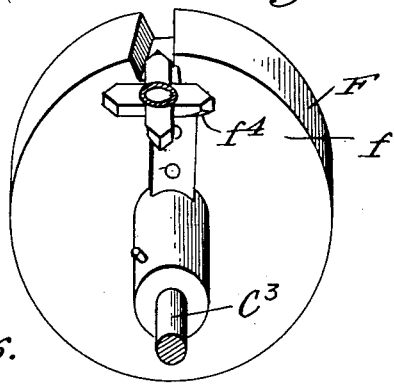
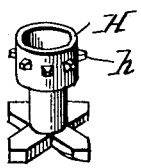
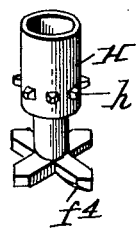
Witnesses
Halbert Brown
D. P. Winston
Inventor
Thomas Armat
By Church & Church
his Attorneys

UNITED STATES PATENT OFFICE.

THOMAS ARMAT, OF WASHINGTON, DISTRICT OF COLUMBIA.

MOTION-PICTURE APPARATUS.

1,112,751.            Specification of Letters Patent.       Patented Oct. 6, 1914.

Application filed October 15, 1913. Serial No. 795,298.

*To all whom it may concern:*

Be it known that I, THOMAS ARMAT, a citizen of the United States, residing at Washington, in the District of Columbia, have invented certain new and useful Improvements in Motion-Picture Apparatus; and I do hereby declare the following to be a full, clear, and exact description of the same, reference being had to the accompanying drawings, forming part of this specification, and to the figures and letters of reference marked thereon.

This invention relates to motion picture apparatus, features of the invention being susceptible of use in mechanism for taking successive pictures on a film strip, although the apparatus adopted for illustrating the invention is more especially designed for the purpose of exhibiting pictures by projecting the same on a screen.

Objects of the invention are primarily to provide an apparatus with which results may be secured substantially equaling results secured with the most highly developed apparatus heretofore known, but at a greatly reduced cost.

Other objects of the invention are to provide an apparatus which is small, light, easily set up for operation and which will operate successfully under widely different light conditions, thus adapting it for use in situations and with sources of light which may be readily obtained without expensive preparation.

In attaining the objects referred to mechanism is provided for handling the film in connection with the shutter interruptions in a manner which makes it possible to use practically half as many pictures per second as has heretofore been considered necessary for a practically successful exhibition, and secondly, to employ a much smaller size film. Other objects referred to are attained in part by arranging the mechanism to guide and feed the film intermittently in a horizontal direction with respect to the axis of the lens instead of vertically, as heretofore, and incidentally to this feature of construction the film handling mechanism is all disposed along a horizontal plane, whereby the center of gravity of the apparatus is lowered and its supporting base made sufficiently wide to dispense with the necessity of means for fastening the same to the table or other support on which it is placed. Other objects are attained by so constructing and arranging the mechanism that the periods of rest of the pictures in proportion to the periods of movement are so exceedingly long that the greatest possible amount of the available candle power of the light is utilized to the greatest advantage, the apparatus illustrated being designed to utilize as much as 90% or 95% of the available light.

Figure 11:
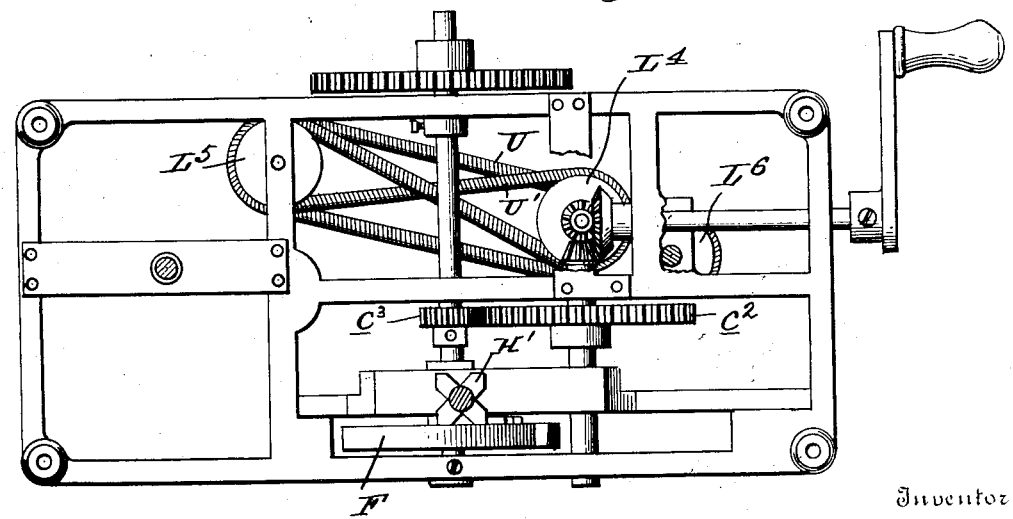

Referring to the accompanying drawings,—Figure 1 is a top plan view of a preferred form of mechanism embodying the present improvements. Fig. 2 is a plan view of the driving gear mounted in the bottom frame, the top plate and film guiding mechanism being removed and some of the parts shown in section. Fig. 3 is a section in a vertical plane substantially on the line indicated at 3—3 in Fig. 1. Fig. 4 is a diagrammatic sectional elevation showing the preferred relative positions of the parts of the intermittently acting film feeding mechanism. Figs. 5, 6, 7 and 8 are detail sectional plan views showing successive positions of the parts of the film feeding mechanism during a feed movement. Fig. 9 is a detail sectional elevation showing the adjustable guiding support for the film. Figs. 10, 11 and 12 are views substantially corresponding to Figs. 1, 2 and 3, but showing a modified and somewhat simplified arrangement of the mechanism. Figs. 13 and 14 are fragmentary perspective views of the operative parts of the film feeding mechanism; and Figs. 15, 16 and 17 are perspective views of slightly modified forms of the film feeding and locking member of said feeding mechanism.

Like letters of reference in the several figures indicate the same parts.

Bearing in mind the fact that in accordance with the present invention the film is fed horizontally so that the successive pictures are displaced sidewise instead of vertically, it will be seen that the film feeding and guiding means or mechanism is all located upon or above a horizontal plate or table-like frame A which is removably mounted on a base frame indicated generally by the letter B. The base frame is provided with suitable legs B' adapted to rest squarely upon a table or shelf and preferably having rubber ferrules thereon as indicated, so that the apparatus will remain firmly in position without liability of shifting laterally. The top plate A is preferably held in position on the frame B by corner screws *a* which may be readily removed, permitting the whole top plate and parts carried thereby to be separated from the bottom frame and parts carried thereby, thus giving complete access to all of the working mechanism for adjustment or repair, and when re-assembled the parts assume proper operative relation and juxtaposition without requiring adjustment by a trained mechanic.

The drive gearing which is mounted in the bottom frame B conveniently embodies a crank shaft C, to the outer end of which the crank handle C' is secured, a pair of bevel gears or pinions *c* serving to transmit the motion of the shaft to a second or intermediate shaft $C^2$ from which motion is transmitted to a third shaft $C^3$ through a gear wheel $c^2$ and pinion $c^3$, whereby the shaft $C^3$ is driven at a relatively high rate of speed. The shaft $C^3$, preferably extends beyond the forward side of the frame B and may have the shutter mounted directly thereon, but it is preferably provided with a gear wheel $C^4$ adapted to mesh with a pinion $c^5$ on a shaft $C^5$ carrying a segmental shutter D, the shaft $C^5$ being journaled in suitable bearings on the top plate A. The shaft $C^2$ also drives a relatively long horizontal shaft E through the medium of bevel pinions *e*, and said shaft E carries near its opposite ends bevel pinions $e'$ adapted to mesh with similar pinions $e^2$ on vertical shafts E' journaled in the plate A and carrying at their upper ends auxiliary segment feeding drums $E^2$ to be presently referred to.

The shaft $C^3$ is directly connected with the shutter in such wise as to eliminate as far as possible any lost motion, and also serves as the driving member for the film feeding mechanism. This film feeding mechanism is one which is designed to give the longest possible period of rest to the film with the shortest possible period of movement, and therefore has had to be especially designed with the parts which move intermittently made exceedingly light to reduce the effects of momentum and inertia and with provision whereby there shall be no lost motion either between the driving and driven parts or between the film and the film engaging parts.

In the embodiment of the invention illustrated, the shaft $C^3$ has rigidly mounted thereon a wheel or disk F provided with a flat face or annular surface *f* in a plane at right angles to the axis of the shaft $C^3$, said face *f* being intersected by the recess or opening $f'$. Journaled on a vertical pin or shaft G with its longitudinal axis at substantially right angles to the axis of the shaft $C^3$, but displaced laterally with respect thereto, as shown in Figs. 2 and 5 to 8, inclusive, is the film feeding member, which is in the form of a sleeve or drum H at the upper end, having teeth or projections *h* thereon for coöperation with a single line of perforations in the lower edge portion of the film I, as shown in Fig. 9, and at the lower portion having the form of a cross or provided with a series of arms H', preferably four in number. End faces or portions $h'$ of said arms are adapted to rest squarely against or have a working fit in engagement with the flat face *f* of the wheel F for the purpose of locking the film feeding drum H against rotation in either direction, but said arms are adapted to turn into the recess or opening $f'$ for effecting a quarter turn of the film feeding drum, the latter being immediately relocked by the engagement of the end faces of the arms and flat face of the wheel as before explained.

For inaugurating the movement of the arms into the recess $f'$ the wheel F is provided with a radial projection $f^2$ which will contact with the arm which is in position to enter the recess or with the arm which has passed out of the recess at the previous operation. In the preferred construction, the radial projection $f^2$ passes under the arm which is about to enter the recess and engages the arm which passed out of the recess at the previous operation, and to accomplish this the parts are arranged with relation to each other, as shown in Fig. 4; that is to say, the vertical axis of the feeding drum is offset with relation to the axis of the shaft $C^3$, in the direction in which the radial projection approaches the same and the radial projection is of such length that its extremity will follow a path, indicated by the dotted line $f^3$, which passes under one of the arms H' and into contact with the other one of the arms H' lying against or in proximity to the flat face of the wheel.

The relation and operation of the parts will be best understood from Figs. 5 to 8, inclusive, and referring to these figures, it will be seen that in Fig. 5 the projection $f^2$ has reached a point where it is just in contact with the farther one of the arms H' and the next succeeding arm H' is in position to enter the recess $f'$. In Fig. 6, the projection has moved the feeding member and arms until the succeeding arm is entering the recess, and being carried forward by contact with the rear wall of the recess, which movement is continued, as shown in Fig. 7, the parts finally assuming the locking position shown in Fig. 8. In the preferred construction the end faces $h'$ of the arms H' are flat and at an angle of 45° to the longitudinal axis of the arms, thus forming inclines, as it were, which assist the movement of the feeding member by contacting with the wall of the recess, as shown in Fig. 6, which wall may also be inclined or slightly cut away to secure a somewhat smoother action of the parts. The under side of the arms are preferably beveled where the same coöperate with the radial projection $f^2$ as shown clearly in the perspective views Figs. 13 to 17, at $f^4$.

In Figs. 10 to 13 the arrangement is such that the radial projection coöperates with the arm about to enter the recess, and for this purpose the vertical axis of the film feeding member on which the arms are located is offset from the axis of the shaft in the opposite direction to that shown in Fig. 4, the construction giving an action which in effect will be similar to the action of the arrangement shown in Figs. 4 to 8, were the wheel F rotated in the opposite direction. Other than just described, the feeding mechanisms are similar in all essential particulars.

The film or picture strip I is preferably wound on and unwound from suitable reels or spools held by frames K, one only of which is shown in Fig. 1, said spools being located just above the level of the plate A and the receiving spool which is indicated in dotted lines in Fig. 1 is driven by a spring belt L from a pulley L′ carried by a vertical shaft $L^2$ receiving its motion from a bevel pinion $l$ in mesh with the pinion $c$ on the shaft C. The film leads to the receiving spool around a driven drum $E^2$ before referred to as operated from the long shaft E. It leads to the drum $E^2$ in the form of a loop which passes around a fixed guide M located preferably forwardly from the film feed drum H, so that the film will be caused to make a partial turn around the feed drum H, thereby insuring the coöperation of the teeth on said feed drum with the perforations near the lower edge of the film. As the loop will usually retain its form the fixed guide is simply a safeguard and may be omitted. At the point where the film crosses the axis of the lens carried in the lens mount N, it preferably passes between apertured plates O and O′. The plate O is pivotally mounted on a vertical shaft at $o$ and is held in contact with the rear face of the film by a spring $O^2$ shown in dotted lines in Fig. 1 as coöperating with an arm on the lower end of the shaft $o$. The film feeds to the plates around a fixed guide M′ after it passes around a driven drum $E^2$ at the left hand side of the machine, said fixed guide being a safeguard as before explained in connection with the guide M. For holding the film in contact with the drums $E^2$ and H, rollers P are provided, said rollers being preferably of similar construction embodying three flange-like annular projections $p$ which will contact with the film at or near the upper edge and on opposite sides of the lower teeth on the drum. Said rollers are mounted on arms P′ journaled in the top plate A on vertical shafts, each of which at its lower end is surrounded by a coil spring $P^2$ serving to hold the rollers in yielding contact with the film as described.

Each of the drums $E^2$ and H is preferably provided with a top flange, as shown in Figs. 1 and 9, adapted to hold the film down and assist in guiding the same in its horizontal travel across the machine, but in order to provide for a very accurate adjustment in this respect, an adjustable bottom guide is preferably provided in the form of a slide R, Fig. 1, secured in place by a set screw R′. The employment of a guide of this character dispenses with the necessity of forming the drums with bottom flanges for preventing downward movement of the film on the drums, and simplifies to a considerable degree the manufacture of the drums themselves. Furthermore in connection with the feeding drum H it reduces the weight somewhat and this consideration may make it desirable to reduce the weight of the feeding drum still more, as, for example, by omitting the top flange as shown in Figs. 15, 16, and 17, or by reducing the height of the drum, as in Fig. 15, or its diameter as in Fig. 16. The construction of the drum is such that it lends itself favorably to being made of ample strength and of very light weight, with the result that the effect of inertia is practically eliminated from the apparatus and the exceedingly high speed of movement attained by the operating devices becomes entirely practical.

Inasmuch as the film feeds horizontally and it is impossible to have the pictures of all films occupy the same identical relation to perforations, it is necessary to make provision whereby the lens and aperture plate may be adjusted horizontally with relation to the feeding drum, and this is accomplished in the present apparatus by mounting the lens and aperture plate on a frame which slides horizontally in a guideway $A^3$ formed on the under side of the plate A. In the particular form of the apparatus shown in Figs. 1 to 3, the frame on which the lens is mounted is indicated at S, the lens being directly carried by a forwardly extending stem S′ on which it is adjustably mounted by a set screw $s$, and the forward or aperture plate O′ of the pair of plates between which the film travels is connected with one edge of the frame S. The frame S is connected by a link $S^2$ with the lower end of a lever $S^3$ pivotally mounted in the plate and adapted to be swung to the right or left for shifting the lens so that its axis may be moved horizontally with relation to the feeding drum to bring the said axis properly central in a horizontal direction with the vertical center of the pictures being exhibited.

In the constructions shown in Figs. 10, 11 and 12 the general arrangement heretofore described is preserved and the parts are specifically of practically the same construction except that the reels T and T' for the film are journaled directly on the top plate A and no supplementary driving or feeding drums such as E² are employed. The film in this instance passes from the drum T around a roller or fixed guide t, thence around a yielding guide t', thence between the plates O and O', before described, thence partly around the feeding drum H against which it is held by a spring-pressed roller P, thence around a yielding guide t², and a fixed guide t³ to the receiving spool T'. The receiving spool T' is driven by spring belts U and U' from a pulley L⁴ corresponding to the pulley L before referred to, said belts being passed around connected pulleys L⁵, and one of them around a pulley L⁶ on the lower end of the shaft carrying the receiving spool T'. The compact and closely associated relation of the parts makes it desirable to employ belts U and U' of considerable length, in order to get a free and smooth action, and hence the connected pulleys L⁵ are located at a considerable distance from the pulleys L⁴ and L⁶, as will be readily understood from an inspection of Fig. 11.

It will be noted that the horizontal arrangement of the film overcomes the necessity of threading the same through guides, inasmuch as it may be placed between the guides of the present apparatus edgewise by simply separating the pressure rollers P, for example, from the drums E² or H and by simply moving the plate O away from the plate O'. This effects quite a saving in time and convenience and by the employment of this arrangement in connection with the feed movement described, it is found that a very narrow film becomes a practical possibility for it may be successfully fed without danger of getting out of alinement, by a single row of perforations near its lower edge, as will be readily understood from an inspection of Fig. 9, where a section and short piece of film is illustrated. By making the film exceedingly light and small and the feed drum light and small, the parts may be moved with exceeding rapidity and the period of movement with relation to the period of rest may be reduced to a point where it almost ceases to be a factor interfering with the light transmitted through the film. The rapid movement and long dwell or period of rest permits of the use of a much less number of pictures in a given time than heretofore thought practical, without causing objectionable scintillation or apparent jerkiness of movement of the figures or objects depicted, provided a proper sequence of interruptions of the light are caused to take place, and in the present apparatus, the shutter is rotated at a speed which causes it to intersect the axis of the lens and obscure the light once during each movement of the film and three times during each period of rest. In other words, the shutter is rotated four times for each combined period of rest and movement in the film.

In the preferred construction a simple single shutter D is employed, the angular dimensions of which are reduced as far as possible and made practically only sufficient to just intercept the light before the film movement begins, and to terminate its first period of obscuration immediately after the film comes to rest. The film movement is as fast or faster with relation to the axis of the lens than is the shutter movement, and is preferably in a direction which is substantially at right angles to the direction of shutter movement; thus, reducing the necessary angular dimensions of the shutter and giving the greatest possible percentage to time during which the light is transmitted and the picture projected on the screen.

The number of pictures which may be projected per second may be reduced to as low as eight or even lower, a number far below the number heretofore considered necessary in order to secure a correct simulation of figures or objects in motion without causing excessive scintillation or jerkiness of movement.

Having thus described my invention, what I claim as new and desire to secure by Letters Patent of the United States, is:

1. In motion picture apparatus, the combination with the lens and the shutter movable transversely of and intersecting the axis of the lens, of means for guiding and feeding the film horizontally across the axis of the lens with an intermittent movement, and means for adjusting the lens horizontally with relation to the film feeding means to position the axis of the lens with relation to the vertical centers of the pictures on the film.

2. In motion picture apparatus, the combination with a horizontally adjustable lens and a shutter movable transversely of and intersecting the axis of the lens in all positions of its adjustment, of means for guiding and feeding the film horizontally across the axis of the lens with an intermittent movement.

3. In motion picture apparatus, the combination with a horizontally arranged supporting frame embodying a top plate and bottom frame separably connected, a lens and horizontally arranged film guiding and feeding mechanism and lens adjusting mechanism mounted on the top plate, of drive gearing journaled in the bottom frame and separably associated in driving engagement with the film guiding and feeding mechanism on the top plate, whereby the top plate may be removed from the bottom frame carrying with it parts projecting above the same for giving access to the driving gearing and connections.

4. In motion picture apparatus, the combination with a horizontally arranged supporting frame, a horizontally adjustable lens carried thereby and a shutter journaled thereon to move in a vertical plane intersecting the axis of the lens, of vertically arranged film guiding drums journaled on said frame in horizontal relation to each other, and means for coöperating with the top and bottom edges of the film for supporting and guiding the same horizontally.

5. In motion picture apparatus, the combination with the horizontally arranged frame, lens adjustable horizontally thereon and a shutter mounted to move in a vertical plane intersecting the axis of the lens, of a film feeding drum mounted on a vertical axis and projecting above the frame, and a guide arranged below the path of the film traveling to and around said drum in a horizontal direction, whereby the film will be supported in its horizontal travel across the axis of the lens.

6. In motion picture apparatus, the combination with a horizontally arranged supporting frame, a lens mounted thereon, and a shutter movable in a vertical plane intersecting the axis of the lens, of a film feeding drum mounted on a vertical axis, and having a single row of projections near its lower edge adapted to coöperate with a single row of perforations in proximity to one edge of the film, and vertically arranged film guiding means, located horizontally on opposite sides of the feeding drum whereby the film will be moved horizontally across the axis of the lens by the engagement of the projections with the lower portion of the film.

7. In motion picture apparatus, the combination with the horizontally arranged supporting frame, lens mounted thereon with its axis substantially horizontal, and shutter movable in a vertical plane intersecting the axis of the lens, of a film feeding mechanism embodying a feeding drum mounted on a vertical axis and provided with radial operating and locking arms, an operating wheel mounted on a horizontal axis and having an annular radial locking surface in a plane at right angles to its axis with a recess therein for the entry of the locking and operating arms on the drum, means for inaugurating the entering movement of said arms into the recess, and means for rotating the wheel.

8. In motion picture apparatus, the combination with the lens, shutter, and drive gearing for the shutter, of an intermittent feed mechanism for the film, embodying a wheel rotated by the drive gearing and having an annular locking surface in a plane at right angles to the axis of the wheel, with a recess therein, a film feeding member journaled on an axis at substantially right angles to the axis of the wheel, said member having a plurality of arms bearing against the locking surface of the wheel and adapted to successively turn into the recess therein for imparting intermittent movement to the member, and means for inaugurating the movement of the arms into said recess.

9. In motion picture apparatus, the combination with film guiding means and driving gear, of a film feeding mechanism operated by the driving gear and embodying a rotating wheel having a substantially flat face in a plane at right angles to its axis of rotation with a recess in said face, a film feeding member journaled on an axis at substantially right angles to the axis of the wheel and having a plurality of arms coöperating with the face to lock the member against rotation and adapted to enter the recess successively to effect intermittent partial rotation of the member, and a projection on the wheel in position to coöperate with the arms and inaugurate their movement into the recess.

10. In motion picture apparatus, the combination with film guiding means and driving gear, of a film feeding mechanism operated by the driving gear and embodying a rotating wheel having a substantially flat face in a plane at right angles to its axis of rotation, with a recess in said face, a film feeding member journaled on an axis at substantially right angles to the axis of the wheel and offset with relation thereto, said member having a plurality of arms for coöperating with the base to lock the member against rotation and adapted to enter the recess successively to effect intermittent rotation of the member, and a projection on the wheel in position to coöperate with the arms and inaugurate their movement into the recess.

11. In motion picture apparatus, the combination with film guiding means and driving gear, of a film feeding mechanism operated by the driving gear and embodying a rotating wheel having a substantially flat face in a plane at right angles to its axis of rotation with a recess in said face, a film feeding member journaled on an axis at substantially right angles to the axis of the wheel and offset with relation thereto, said member having a plurality of arms adapted to coöperate with the face to lock the member against rotation and adapted to enter the recess successively to effect intermittent rotation of the member, and a radial projection on the wheel having a path of movement under one of the locking arms and intersecting the other of said locking arms, whereby the projection will coöperate with one arm only to inaugurate the entry of an arm into the recess.

12. In motion picture apparatus, the combination with film guiding means and driving gear, of a film feeding mechanism operated by the driving gear and embodying a rotating wheel having a substantially flat face in a plane at right angles to its axis of rotation with a recess in said face, a film feeding member journaled on an axis at substantially right angles to the axis of the wheel and offset with relation thereto in the direction toward which the periphery of the wheel approaches the same, said member having a plurality of arms adapted to coöperate with the said face to lock the member against rotation and adapted to enter the recess successively to effect intermittent rotation of the member, and a projection on the wheel having a path of movement beneath the arm lying in position to enter the recess and intersecting the arm lying in position to move away from the locking face of the wheel, whereby the movements of the arms will be inaugurated by the projection, substantially as described.

THOMAS ARMAT.

Witnesses:
  THOMAS DURANT,
  MELVILLE D. CHURCH.